J. J. KOVAR.
HARROW CART.
APPLICATION FILED MAY 19, 1920.
1,392,946.
Patented Oct. 11, 1921.
2 SHEETS—SHEET 2.
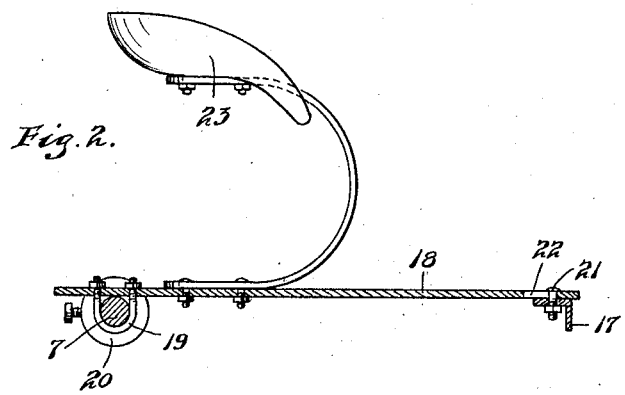
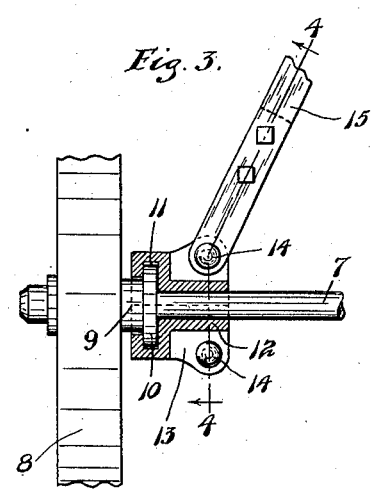
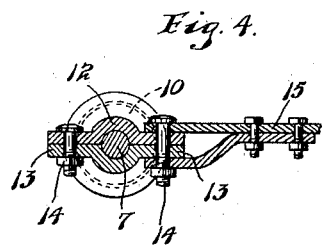
INVENTO
JOSEPH J. KOVAR.
BY HIS ATTORNEYS.

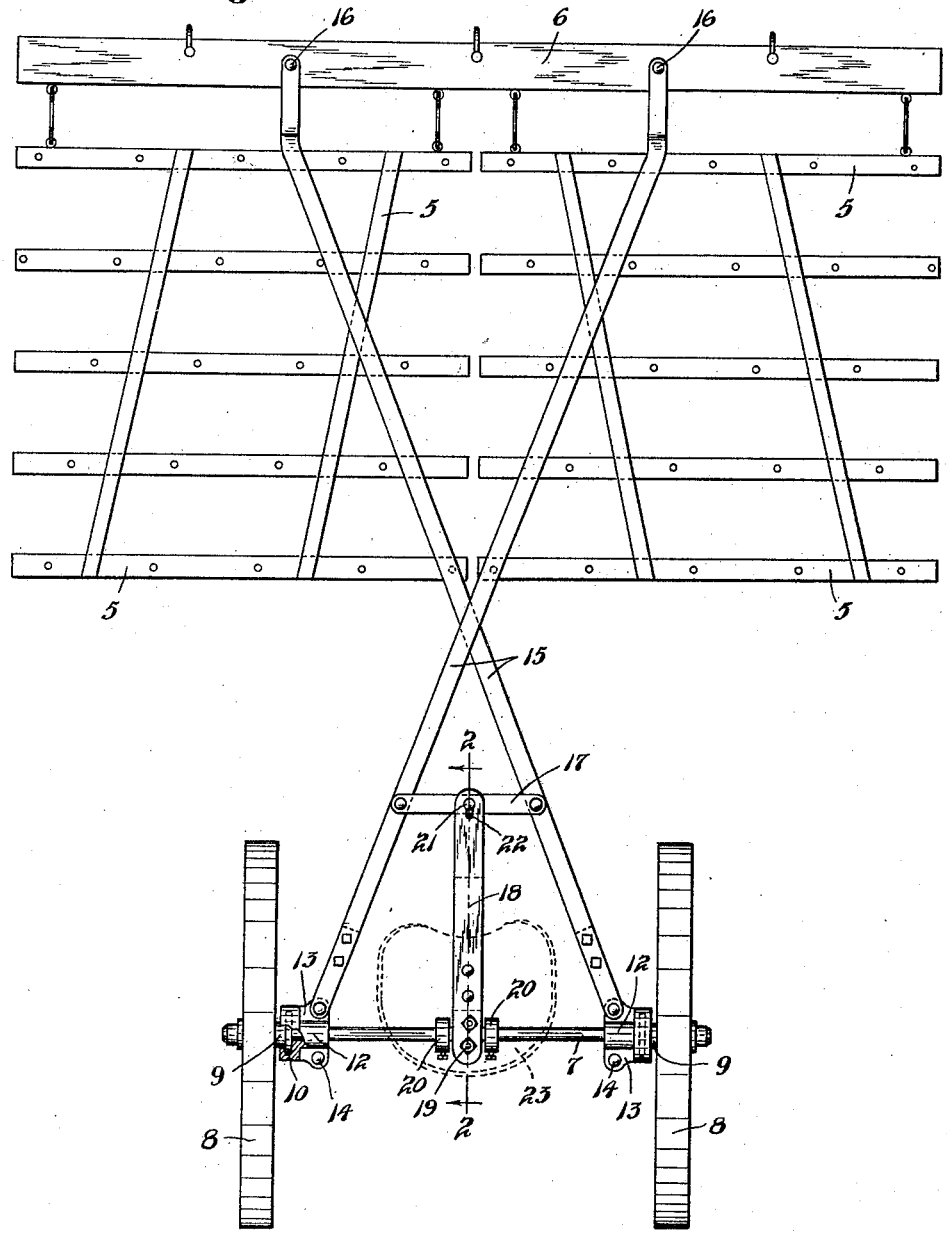

UNITED STATES PATENT OFFICE.

JOSEPH J. KOVAR, OF OWATONNA, MINNESOTA.

HARROW-CART.

1,392,946. Specification of Letters Patent. Patented Oct. 11, 1921.

Application filed May 19, 1920. Serial No. 382,520.

*To all whom it may concern:*

Be it known that I, JOSEPH J. KOVAR, a citizen of the United States, residing at Owatonna, in the county of Steele and State of Minnesota, have invented certain new and useful Improvements in Harrow-Carts; and I do hereby declare the following to be a full, clear, and exact description of the invention, such as will enable others skilled in the art to which it appertains to make and use the same.

My present invention has for its object to provide an extremely simple and highly efficient harrow cart, and to this end, it consists of the novel devices and combinations of devices hereinafter described and defined in the claims.

In the accompanying drawings, which illustrate the invention, like characters indicate like parts throughout the several views.

Referring to the drawings:

Figure 1 is a plan view of a harrow and the improved harrow cart;

Fig. 2 is a view partly in side elevation and partly in longitudinal vertical section taken on the line 2—2 of Fig. 1, on an enlarged scale;

Fig. 3 is a detail view partly in plan and partly in horizontal section; and

Fig. 4 is a detail view principally in vertical section taken on the irregular line 4—4 of Fig. 3.

The numeral 5 indicates two harrow sections flexibly attached to a draft bar 6. The improved harrow cart includes a relatively long axle 7, on which is loosely journaled a pair of relatively large wheels 8 having wide faces. Formed with the inner ends of the hubs 9 of the wheels 8 are annular flanges 10 rotatively mounted in annular internal channels 11 formed in two-part boxes 12. These boxes 12 have coöperating half-seats, in which the axle 7 is mounted. The members of each box 12 have formed therewith front and rear horizontally disposed overlapping perforated ears 13, through which are inserted nut-equipped bolts 14 for frictionally clamping the members of the boxes onto the axle 7 and interlocking the flanges 10 therewith.

The outer ends of the wheel hubs are closed and, in actual practice, the channels 10 will be filled with grease or hard oil to lubricate the wheels 8 and the flanges 10. The interlocking engagement of the flanges 10 and the channels 11 makes the boxes 12 dust-proof and prevents leakage of grease or oil therefrom.

A pair of crossed drag bars 15 have bifurcated rear ends, between the prongs of which the front ears 13 extend and which drag bars are pivoted thereto by the respective bolts 14. The drag bars 15 extend over the harrow sections 5 and their front ends are bent into parallel arrangement and secured by pivots 16 to the draft bar 6. Rearward of the crossed intermediate portions of the drag bars 15, the same are pivotally connected by an angle cross bar 17.

A longitudinally extended seat-supporting bar 18 has its rear end portion loosely supported on the axle 7 and secured thereto by a U-bolt 19. Laterally spaced collars 20, on the axle 7, hold the seat-supporting bar 18 against edgewise movement. The front end of the seat-supporting bar 18 rests on the cross bar 17, and is pivoted thereto by a nut-equipped bolt 21, which extends through a longitudinally extended slot 22 in the seat-supporting bar 18 and a bore in the cross bar 17. A seat 23 is secured to the seat-supporting bar 18.

The long axle of the harrow cart and large wheels having wide faces give the cart a balance that makes it extremely simple and comfortable to ride on the same.

What I claim is:

1. A harrow cart comprising an axle having a pair of wheels loosely journaled thereon, boxes on the axle with which the inner ends of the hubs interlock to hold the wheels on the axle, and a pair of crossed drag bars pivotally secured to the boxes and adapted to be attached to a draft bar.

2. A harrow cart comprising an axle having a pair of wheels loosely journaled thereon, said wheels having on the inner ends of their hubs annular flanges, two-part boxes clamped onto the axle and having annular internal channels in which the flanges on said hubs are rotatively mounted to hold the wheels on the axle, and a pair of crossed drag bars pivotally secured to the boxes and adapted to be attached to a draft bar.

3. A harrow cart comprising an axle having a pair of wheels loosely journaled thereon, said wheels having on the inner ends of their hubs annular flanges, two-part boxes fitting around the axle and having annular internal channels in which the flanges of said hubs are rotatively mounted, the members of said boxes being provided with overlapping perforated ears to receive nut-equipped bolts for frictionally clamping the members of the boxes onto the axle, and crossed drag bars having bifurcated rear ends adapted to receive between the prongs thereof certain of said ears and being pivotally connected thereto by the bolts extending through said ears, the forward ends of the drag bars being adapted to be secured to a draft bar.

4. A harrow cart comprising an axle having a pair of wheels loosely journaled thereon, a pair of crossed drag bars pivotally secured in respect to the axle and adapted to be attached to a draft bar, a cross link pivotally connecting the drag bars, and a seat-supporting bar having one of its ends supported on the axle and its other end pivotally connected to the cross link.

5. A harrow cart comprising an axle having a pair of wheels loosely journaled thereon, a pair of crossed drag bars pivotally secured in respect to the axle and adapted to be attached to a draft bar, a cross link pivotally connecting the drag bars, a seat-supporting bar having one of its ends pivotally connected to the cross link, a U-bolt connecting the other end of the seat-supporting bar to the axle, and a pair of collars on the axle between which the seat-supporting bar is held.

In testimony whereof I affix my signature in presence of two witnesses.

JOSEPH J. KOVAR.

Witnesses:
CARL K. BENNETT,
ESTHER C. DUBBE.